United States Patent
Urakawa

(10) Patent No.: US 7,120,469 B1
(45) Date of Patent: Oct. 10, 2006

(54) PORTABLE COMMUNICATION DEVICE FOR DOMESTIC AND INTERNATIONAL COMMUNICATIONS AND AUTOMATIC CALLING METHOD FOR DOMESTIC AND INTERNATIONAL CALLS

(75) Inventor: Yasutaka Urakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 715 days.

(21) Appl. No.: 09/593,038

(22) Filed: Jun. 13, 2000

(30) Foreign Application Priority Data

Jun. 14, 1999 (JP) .......................... 11-166302
Feb. 18, 2000 (JP) ...................... 2000-041863

(51) Int. Cl.
  *H04M 1/00* (2006.01)
  *H04B 1/38* (2006.01)
  *H04Q 7/20* (2006.01)

(52) U.S. Cl. .................................. 455/564; 455/414.1
(58) Field of Classification Search ................ 455/564, 455/414.1, 575.1, 90.1, 566, 558, 426.1, 455/432.1; 379/216.01, 221.01, 221.02
  See application file for complete search history.

(56) References Cited

U.S. PATENT DOCUMENTS

| | | | | |
|---|---|---|---|---|
| 5,305,372 A | * | 4/1994 | Tomiyori | 455/564 |
| 5,732,349 A | * | 3/1998 | Sanpei et al. | 455/435 |
| 6,073,005 A | * | 6/2000 | Raith et al. | 455/404 |
| 6,081,708 A | * | 6/2000 | Vasnier | 455/426 |
| 6,259,914 B1 | * | 7/2001 | Koster | 455/432 |
| 6,360,108 B1 | * | 3/2002 | Rogers | 455/564 |

FOREIGN PATENT DOCUMENTS

| | | |
|---|---|---|
| DE | 197 11 096 | 9/1998 |
| EP | 0 526 832 | 2/1993 |
| EP | 0 782 358 | 7/1997 |
| EP | 0 858 204 | 8/1998 |
| JP | 01212152 A * | 8/1989 |
| JP | 4-354446 | 12/1992 |
| JP | 5-37457 | 2/1993 |
| JP | 5-37 457 | 12/1993 |
| JP | 8-163639 | 6/1996 |
| JP | 8-186856 | 7/1996 |
| JP | 8-191264 | 7/1996 |
| JP | 8-307508 | 11/1996 |
| JP | 11-341141 | 10/1999 |
| JP | 11-341141 | 12/1999 |
| WO | WO 98/46035 | 10/1998 |
| WO | WO 98/48575 | 10/1998 |
| WO | WO 98/48577 | 10/1998 |

* cited by examiner

*Primary Examiner*—Erika Gary
(74) *Attorney, Agent, or Firm*—Oblon, Spivak, McClelland, Maier & Neustadt, P.C.

(57) ABSTRACT

An internal memory has an address book table for registering data regarding a communication destination party, a telephone number, and a country flag indicative of a country where the communication destination party is present, in a manner that they are shown corresponding to one another. A calling processor compares a country flag attached to a communication destination party selected using a memory dial function, and information obtained from an RF module regarding a country where the communication circuit can be established. When the flag information and the information from the Rf module coincide, the calling processor determines that the ongoing call is a domestic call, and thus dials the telephone number as registered in the address book table and, when they do not coincide, the calling processor determines that the ongoing call is an international call, and thus dials international access and country codes prior to the telephone number registered in the address book table. Using a portable communication device having the above arrangement, the user can automatically place a call to a party in or out of the country where the user is present even when the destination party information for each communication destination candidate party is registered only in a single formation.

29 Claims, 18 Drawing Sheets

Address Book Table

| Name | Telephone Number | County Flag |
|---|---|---|
| TARO | 03-1234-5678 | 0 |
| TOM | 408-987-6543 | 1 |
| ALAN | 021-321-1234 | 2 |

0: Japan
1: U.S.
2: Others

Emergency Telephone Number Table

| County Flag | 0(Japan) | County Flag | 1(U.S.) |
|---|---|---|---|
| 110 | | 911 | |
| 119 | | 911 | |

Fig. 3

Dial Operation Procedure 1

Address Book Table

| Country Flag | 0 |
|---|---|
| Name | Telephone Number |
| TARO | 03-1234-5678 |
|  |  |

| Country Flag | 1 |
|---|---|
| Name | Telephone Number |
| TOM | 408-987-6543 |
|  |  |

| Country Flag | 2 |
|---|---|
| Name | Telephone Number |
| ALAN | 021-321-1234 |
|  |  |

Fig. 8

| | Name | Telephone Number |
|---|---|---|
| (a) | TARO | XXX−81−3−1234−5678 |

| | Name | Telephone Number |
|---|---|---|
| (b) | TARO | +81312345678 |

| | Name | Telephone Number |
|---|---|---|
| (c) | TARO | XXX81312345678 |

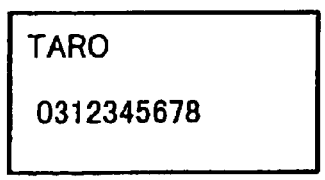 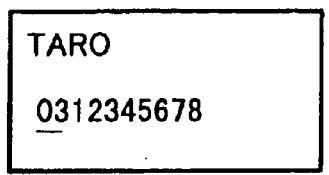 
(a)           (b)           (c)
FIG. 13

Announcement Information Message Content

| Information Items | Direction | Class | Length |
|---|---|---|---|
| Message Type | Down | Must | 1 |
| Network Number | Down | Must | 2 |
| Regulation Information | Down | Must | 3 |
| Control Channel Structure Information | Down | Must | 6~33 |
| Mobile Station Transmission Power Designation | Down | Must | 1 |
| ⋮ | ⋮ | | ⋮ |

FIG. 15

Network Number Information Element

```
Bit
    8   7   6   5   4   3   2   1
 ┌───────┬───────────────────────────┐
 │Reserve│      Country  Code        │
 ├───────┴───────────┬───────────────┤
 │ Company Group Number │ Network Number
                        │  within Group │
 └──────────────────────┴───────────────┘
```

(1) Country Code : Country Identification

| Bit | 7 6 5 4 3 2 1 | Country |
|---|---|---|
|  | 0 0 0 0 0 0 1 | : Japan |
|  | Others | : Reservation |

(2) Company Group Number : Business Group Identification

| Bit | 8 7 6 5 | Business Group |
|---|---|---|
|  | 0 0 1 0 | : Company A |
|  | 0 1 0 1 | : Company B |
|  | 0 1 1 1 | : Company C |
|  | : |  |

(3) Network Number within Group : Identification of Local Network within Business Group

FIG. 16

Example of Using Country Setting Screen

| Name | Telephone Number | Using Country Information |
|------|------------------|---------------------------|
| TARO | 0312345678 | 1 (Japan) |
|      | 00181312345678 | 2 (U.S.) |

FIG. 19

PORTABLE COMMUNICATION DEVICE FOR DOMESTIC AND INTERNATIONAL COMMUNICATIONS AND AUTOMATIC CALLING METHOD FOR DOMESTIC AND INTERNATIONAL CALLS

BACKGROUND OF THE INVENTION

1. Field of the Invention

The present invention generally relates to a portable communication device, and particularly to a device employing an automatic calling method for calling in which the user making a call using a memory dial function need not be concerned as to whether the call is a domestic or international call, and the automatic calling method.

2. Description of the Related Art

Communication devices, such as portable telephone devices and portable information terminals having a telephone communication function, generally have a memory dial function. A memory dial function is a function for storing and retrieving a name and telephone number of a communication destination party from an internal memory, which is referred to as an electronic telephone book or an address book, to allow the user making a call using a memory dial function to complete a call by merely selecting the name of a party he wishes to call from the name list shown on the LCD of a portable telephone device. The user does not need to actually dial the number.

Here, since there is no uniform communication format usable for worldwide radio telephone systems, a portable telephone device for use, for example, in Japan may not be used as is in the United States, where a different communication format is adopted. However, telephone devices employing an exchangeable RF (radio frequency) module for attachment to the device body have recently been considered. The body of such a telephone device for use, for example, in Japan can also be used in the U.S. by simply exchanging of its RF module with the one for use in the U.S. Also integrated portable telephone devices incorporating a plurality of radio technologies are now available. In addition, it is expected that portable telephone devices usable in two or more countries will be realized when W-CDMA (Wideband Code Division Multiple Access) and other global standard formats for next generation portable telephone devices are put into a practicable use.

When the main body of a certain telephone device becomes usable in two or more countries, address data stored in the internal memory of the device body will be usable in Japan and in other countries.

However, for a portable telephone device having an exchangeable RF module, even if the body of a portable telephone device for use, for example, in Japan is usable in the U.S. after RF modules of, are exchanged, the exchanging is not enough to make the memory dial function of the device effectively usable in the U.S. That is, it is generally the case that a telephone number registered in the address book of a portable telephone device for use in Japan is the sequence required to make a call from one party in Japan to another party (Mr. A) in Japan (i.e., a number generally beginning with "0"). Therefore, conventionally, a person in the U.S. cannot make a call to Mr. A in Japan using a memory dial function of that portable telephone device because the registered telephone number for establishing a domestic telephone circuit connection with a party in the same country where the user is present does not include the digits necessary for making an international call, i.e., an international access code for specifying an international telephone company and a country code of the communication destination party. Therefore, dialing a telephone number registered in the internal memory does not achieve a telephone call from a party in the U.S. to a party in Japan. In light of this, an unfulfilled desire for users is the ability to make a call using a memory dial function without having to concern themselves as to whether the dialed party is then in them same country where the user is then present.

It is also highly desired that a user be able to use a memory dial function without concern as to whether or not a communication destination party is in or out of the country where the user is then present, particularly as it is expected that it will soon be possible to place domestic and internationals calls from anywhere in the world using the same portable telephone device due to improvement of portable telephone devices and adoption of uniform global radio telephone communication standards.

SUMMARY OF THE INVENTION

The present invention has been conceived to overcome the above problems and aims to provide a portable communication device and an automatic calling method for automatically calling a party located in or out of the country where the user is then present, using a memory dial function, without causing the user to concern the location of the communication destination party.

In particular, the present invention aims to provide a portable communication device and an automatic calling method for automatically calling a party using a memory dial function even when communication destination party information is registered for each communication destination party only in a single format.

Also, the present invention aims to provide a portable communication device and an automatic calling method for efficiently dialing a call using a memory dial function even when world uniformed radio telephone communication format is adapted.

In order to achieve the above objects, according to the present invention, there is provided a portable communication device for communication via a connected telephone circuit, comprising communication destination party information memory means for storing communication destination party information including communication destination party identifying information of a communication destination party, subscriber number information of the communication destination party, and country identifying information for identifying a country where the communication destination party is a subscriber of telephone service; input/output means for displaying, in response to a user's operation, a list of the communication destination party identifying information stored in the communication destination party information memory means; calling processing means for dialing a call to a communication destination party selected from the list of the communication destination party identifying information displayed by the input/output means; and using country information recognizing means for recognizing a country where the portable communication device is connected to the telephone circuit; wherein the calling processing means automatically converts, upon necessary, the subscriber number information stored in the communication destination party information memory means into a subscriber number suitable for a domestic or international call based on a result of comparison between the using country information recognized by the using country information recognizing means and the country identifying information of the communication destination party selected as a call destination, and dials a resultant subscriber number.

The subscriber number information includes a subscriber number for a domestic call from a country where the communication destination party is a subscriber of the telephone service to the communication destination party in the country, and the calling processing means automatically converts the subscriber number of the communication destination party, registered in the communication destination party information memory means, into a subscriber number suitable for an international call when the comparison between the using country information and the country identifying information results that they do not coincide with each other, and dials the resultant subscriber number, the subscriber number suitable for an international call including a country code of a country specified by the country identifying information of the communication destination party.

The subscriber number information includes information, at least a country code, which enables an international call from outside a country where the communication destination party is a subscriber of the telephone service to the communication destination party in the country and the calling processing means automatically converts the subscriber number of the communication destination party, registered in the communication destination party information memory means, into a subscriber number suitable for a domestic call to the communication destination party by deleting at least the country code therefrom when the comparison between the using country information and the country identifying information results that they coincide with each other, and dials the resultant subscriber number.

According to another aspect of the present invention, there is provided a portable communication device for communication via a connected telephone circuit, comprising communication destination party information memory means for storing communication destination party information including communication destination party identifying information of a communication destination party, subscriber number information of the communication destination party, and country identifying information for identifying a country where the communication destination party is a subscriber of a telephone service; input/output means for displaying, in response to a user's operation, a list of the communication destination party identifying information stored in the communication destination party information memory means; calling processing means for dialing a call to a communication destination party selected from the list of the communication destination party identifying information displayed by the input/output means; and using country information recognizing means for recognizing a country where the portable communication device is connected to the telephone circuit; wherein when making a call, the calling processing means is able to change a selected subscriber number information, based on judgement that the subscriber number information of the communication destination party, stored in the communication destination party information memory means, is not usable for dialing a call, the judgement being based on comparison between the using country information recognized by the using country information recognizing means and the country identifying information of the communication destination party selected as a called party.

The calling processing means automatically places the selected subscriber number information in an edit mode when the using country information does not coincide with the country identifying information.

The above portable communication device further comprises a temporary number memory means for temporarily storing a temporary number and using country information when the calling processing means calls the communication destination party selected, by dialing the temporary number, the temporary number being formed by editing the subscriber number information, wherein the calling processing means calls the communication destination party by dialing the temporary number temporarily stored, when the using country information recognized by the using country information recognizing means coincides with the using country information of the communication destination party stored in the temporary number memory means.

The information of the communication destination party, stored in the temporary number memory means, is erased when the using country information recognized by the using country information recognizing means does not coincide with the using country information of the communication destination party, stored in the temporary number memory means.

According to still another aspect of the present invention, there is provided a portable communication device for communication with a communication destination party via a base station through a connected telephone circuit, comprising communication destination party information memory means for storing communication destination party information including communication destination party identifying information of a communication destination party, subscriber number information of the communication destination party, and country identifying information for identifying a country where the communication destination party is a subscriber of a telephone service; input/output means for displaying, in response to a user's operation, a list of the communication destination party identifying information stored in the communication destination party information memory means; using country information recognizing means for obtaining, from information sent from the base station, using country information of a country where the portable communication device is connected to the telephone circuit; calling processing means for specifying a subscriber number when a call is made to a communication destination party selected as a called party from a list of communication destination party identifying information displayed by the input/output means, based on a comparison between the using country information recognized by the using country information recognizing means and the country identifying information of the communication destination party selected as a called party.

The communication destination party information memory means stores, in place of the communication destination party information, at least one information, including a pair, for every communication destination party, constituting of using country information and subscriber number information to be referred to when making a call from the using country to the communication destination party, and the calling processing means places a call based on subscriber number information designated in communication destination party information including using country information coincident with using country information recognized by the using country information recognizing means.

According to yet another aspect of the present invention, there is provided a portable communication device for communication with a communication destination party via a base station through a connected telephone circuit, comprising communication destination party information memory means for storing communication destination party information including communication destination party identifying information of a communication destination party, subscriber number information of the communication destination party, and country identifying information for identifying a country where the communication destination party is a subscriber of a telephone service; input/output means for displaying, in response to a user's operation, a list of the communication destination party identifying information stored in the communication destination party information memory means; and calling processing means for dialing a call to a communication destination party selected from the list of the communication destination party identifying information displayed by the input/output means; wherein the calling processing means adds country identifying information of the communication destination party selected as a called party to the subscriber number information of the selected communication destination party and sends to the base station when making a call.

The communication destination party information memory means is provided detachably.

The above portable communication device carries out radio communication using a circuit fixedly connected to circuits of the country to which the circuit was initially connected at a time of making a call.

The above portable communication device for radio communication further comprises a communication module for connecting to a telephone circuit; and a communication device main body for communication via the communication module; wherein the communication module comprises an antenna, transmitter/receiver means for transmitting and receiving a message via the antenna, and radio communication control means for controlling radio communication according to a predetermined communication format.

The above portable communication device is in the form of a portable telephone device.

The communication module is formed detachable with respect to the communication device main body.

The communication module has a part abutting on the communication device main body, the part having a different shape for every country; and the using country information recognizing means specifies using country information of the communication module connected thereto by detecting a shape of the part abutting on the communication device main body, of the communication module.

The above portable communication device further comprises a communication module for connecting to a telephone circuit; and a communication device main body for communication via the communication module; wherein the communication module has using country information replying means for replying using country information in response to an inquiry from the calling processing means.

The above portable communication device further comprises communication destination party information registration means for generating communication destination party information based on information concerning a communication destination party input via the input/output means, a subscriber number of the communication destination party, and a country where the communication destination party is a subscriber of the telephone service, and for registering the communication destination party information to the communication destination party memory means.

The communication destination party information memory means has a country registration area provided thereto in advance for every country identifying information so that communication destination party identifying information and a subscriber number are stored in the country registration area of a corresponding country.

According to yet another aspect of the present invention, there is provided an automatic calling method employed in a portable communication device for communication via a connected telephone circuit, comprising a communication destination party candidate displaying step of extracting communication destination party identifying information from communication destination party information memory means and displaying a list thereof, said memory means stores the communication destination party information including communication destination party identifying information of a communication destination party, subscriber number information of the communication destination party, and country identifying information for identifying a country where the communication destination party is a subscriber of telephone service; a comparison step of comparing country identifying information corresponding to a communication destination party selected from the list of communication destination party identifying information displayed at the communication destination party candidate displaying step, and using country information specifying a country where the portable communication device is connected to the telephone circuit; and a calling step of automatically converting, upon necessity, the subscriber number information of the communication destination party selected, into a subscriber number suitable for a domestic or international call based on a result of comparison made at the comparison step, and making a call.

According to yet another aspect of the present invention, there is provided an automatic calling method employed in a portable communication device for communication via a connected telephone circuit, comprising a communication destination party candidate displaying step of extracting communication destination party identifying information from communication destination party information memory means to display a list thereof, said memory means stores the communication destination party information including communication destination party identifying information of a communication destination party, subscriber number information of the communication destination party, and country identifying information for identifying a country where the communication destination party is a subscriber of telephone service; a comparison step of comparing country identifying information corresponding to a communication destination party selected from the list of communication destination party identifying information displayed at the communication destination party candidate displaying step, and using country information specifying a country where the portable communication device is connected to the telephone circuit; and a calling step of displaying, for editing, the subscriber number information when a judgement is made based on a result of comparison made at the comparison step, that the subscriber number information of the communication destination party, stored in the communication destination party information memory means, is not usable intact for dialing a call, and making a call using a resultant subscriber number edited.

As described above, according to the present invention, in making a call, module usable country information and country identifying information corresponding to a selected communication destination party is compared to determine whether an intended call is a domestic or international call based on the comparison result. Then, the registered communication destination party information is automatically converted, if necessary, into a subscriber number suitable for a domestic or international call before dialing. With this arrangement, a user of a portable communication device, irrespective of a country where the portable communication device is used, can always follow the same predetermined procedure to make a call to a registered communication destination party.

As a user can make a domestic or international call to a certain communication destination party as long as information of the party is registered to the communication destination party information memory means in at least a single format, as described above, the amount of data registered to the communication destination information memory means and labor for the registration can be reduced.

When comparison between using country information and country identifying information results in a judgement that a registered subscriber number information for a communication destination party cannot be used as is for dialing, the subscriber number information is displayed so that a user can edit the number to thereby designate a correct subscriber number.

Edited subscriber number information is temporarily stored so that the edited information is available for use in dialing again to the same communication destination party from the same country. With this arrangement, even when a registered subscriber number information cannot be used intact for dialing, the user can be freed from the need to repeat an edit process.

As using country information is obtained from the information supplied from a base station, a portable telephone communication device need not have any particular structure or shape for recognition of using country information.

As country identifying information of a communication destination party is attached, when making a call, to subscriber number information of a communication destination party and sent to a base station, the base station compares the received country identifying information with country identifying information for identifying a country where the base station is located, and converts, if necessary, the subscribe number information into subscriber number information suitable for a domestic or international call. This eliminates the need for a portable telephone device to have an automatic conversion function with respect to subscriber number information into a subscriber number suitable for either a domestic or international call.

As a call party destination information memory means is formed detachable from a portable communication device, a user moving to other places can carry only the communication destination party information memory means with him and install the means into a portable telephone device obtained in the destination place. With this arrangement, a user using a memory dial function in any destination place can use the communication destination party information stored in the communication destination party information memory means.

As a call circuit is maintained fixed to a country to which the device was initially connected when a call was made, useless switching of base stations, which may occur when a portable telephone device is used, for example, along a country border, can be avoided.

As communication destination party information is stored in at least one format for each communication destination party so that an appropriate format is chosen when making a call, automatic conversion of subscriber number information before making a call may be unnecessary.

Also, a country where a detachable communication module can be used can be recognized by way of software or hardware.

BRIEF DESCRIPTION OF THE DRAWINGS

The above and the other objects, features, and advantages of the present invention, will become further apparent from the following description of the preferred embodiment taken in conjunction with the accompanying drawings wherein:

In the following, preferred embodiments of the present invention will be described referring to the accompanying drawings.

FIG. 3 is a diagram showing an example of a data structure of an address book table according to the first preferred embodiment;

FIG. 8 is a conceptual diagram showing a structure of internal data stored in an internal memory according to the second preferred embodiment;

FIG. 13 is a diagram showing an example of a display screen in an edit mode according to a fourth preferred embodiment;

FIG. 15 is a diagram showing a format of announcement information according to standard STD-27 format, mentioned as an example in a sixth preferred embodiment;

FIG. 16 is a diagram showing details of a network number shown in FIG. 15;

FIG. 19 a diagram showing an example of a data structure for an address book table according to a ninth preferred embodiment.

DESCRIPTION OF THE PREFERRED EMBODIMENTS

Preferred embodiments of the present invention will be described with reference the accompanying drawings.

Embodiment 1

Figure 1:
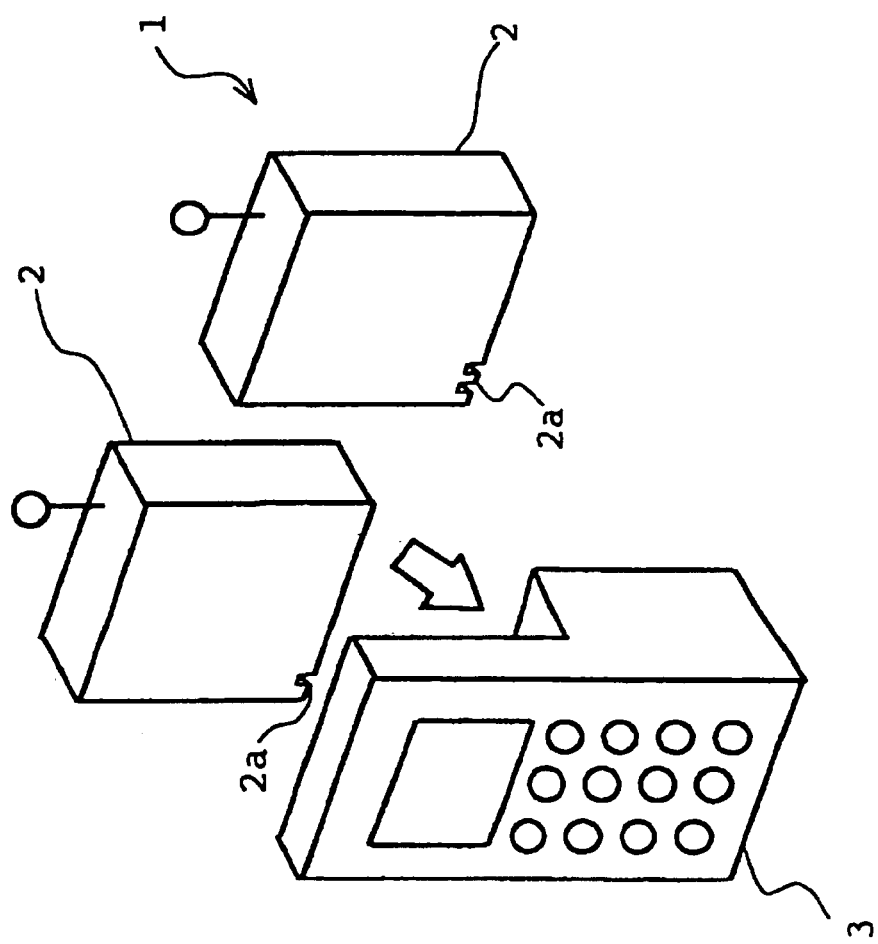
FIG. 1 is a schematic diagram showing a general structure of a portable communication device of one preferred embodiment of the present invention in the form of a portable telephone device.
Figure 2:
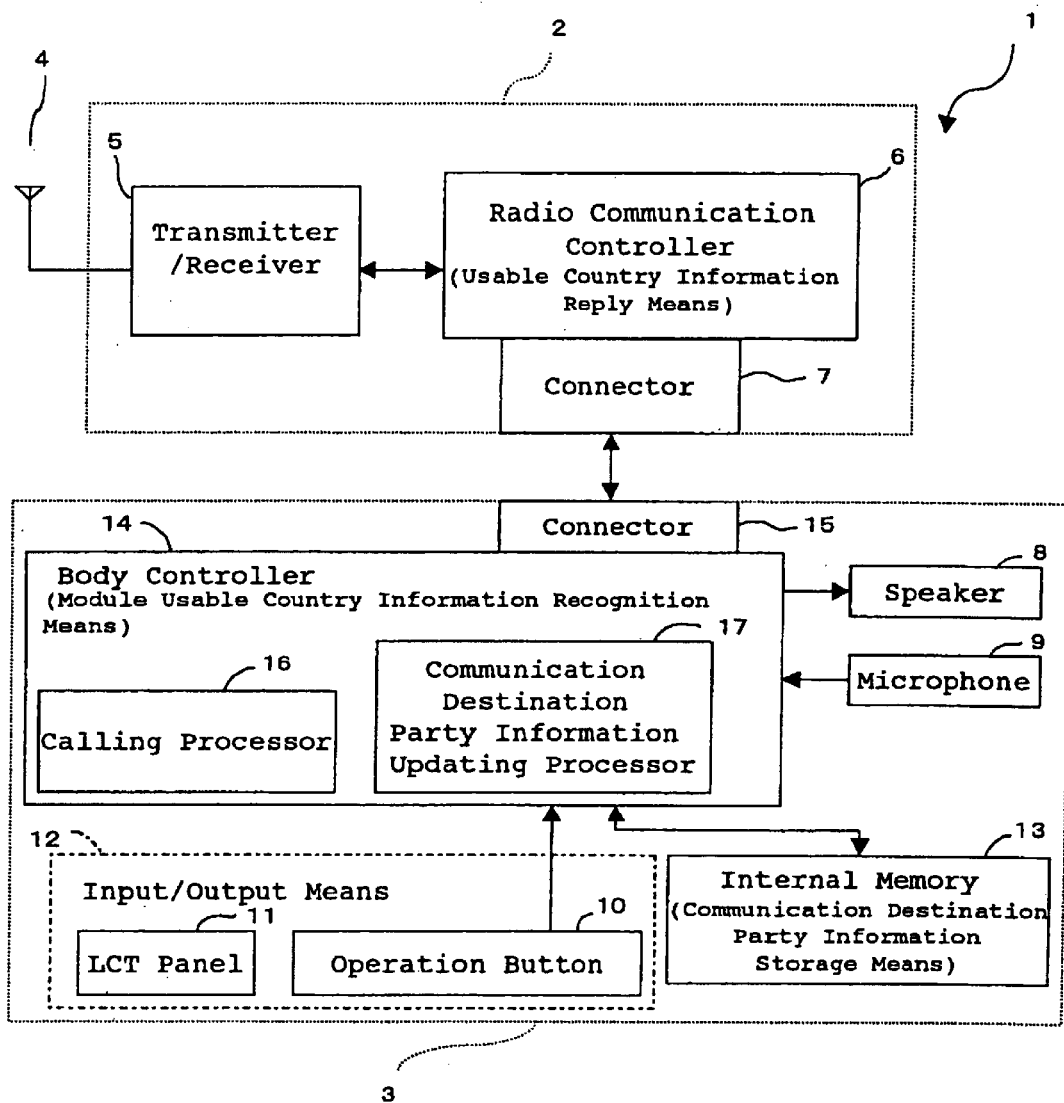
FIG. 2 is a block diagram showing a structure of the portable telephone device of FIG. 1.

FIG. 1 is a schematic diagram showing a complete structure of a portable communication device of one preferred embodiment according to the present invention in the form of a portable telephone device. FIG. 2 is a block diagram showing a structure of the portable telephone device. A portable telephone device 1 in this embodiment comprises a radio communication module (hereinafter referred to as an RF module) 2 for establishing a radio circuit connection, and a telephone device body 3 for connection with the RF module 2. The RF module 2 comprises a transmitter/receiver 5 for transmission and reception of a message via an antenna 4 with respect to a base station (not shown), a radio communication controller 6 for radio communication control according to the communication systems determined in each country, and a connector 7 for connection with the telephone device body 3. The RF module 2 is formed detachable from the telephone device body 3. FIG. 1 shows two different types of RF modules 2, one for use in Japan and the other for use in the U.S.

The telephone device body 3 comprises a speaker 8, a microphone 9, an input/output means 12 having an operation button 10 and an LCD panel 11, an internal memory 13 for storing an address book and so on, a body controller 14 for controlling overall function of the portable telephone device 1, and a connector 15 for connection with the RF module 2. The body controller 14 includes a calling processor 16 and a communication destination party information updating processor 17. The calling processor 16 puts through a call to a communication destination party which was selected from the list displayed on the LCD panel 11. The communication destination party information updating processor 17, serving as a communication destination party information registration means, prepares communication destination party information based on the data on a communication destination party, a subscriber number, and a communication destination country, the data being input through operation of the operation button 10 according to the guidance shown in the LCD panel 11. The updating processor 17 is responsible also for registration, updating, and deletion of communication destination party information.

In order to place a call from a portable telephone device 1 using a memory dial function, the user presses the operation button 1 to display the list of communication destination candidate parties on the LCD panel 11, and selects the party he wishes to call from the list. Then, the calling processor 16 retrieves and displays names of communication destination candidate parties from the internal memory 13 in response to the user's input operation, and, once the user inputs a selection, retrieves the telephone number of the selected party from the internal memory 13 to prepare a call setting request to be sent to the RF module 2. Note that sending a call setting request constitutes putting through a call. The RF module 2 forwards the call setting request, having been prepared by the body controller 14, to the base station for establishment of a radio connection line according to a predetermined procedure.

FIG. 3 is a schematic diagram showing a structure of internal data stored in the internal memory 13 in this embodiment. The internal memory 13 stores, as a communication destination party information storage means, information concerning communication destination candidate parties, and stores, as an emergency telephone number storage means, emergency telephone numbers effective in respective countries where the portable telephone device 1 is expected to use in a manner that relevant numbers over the respective countries are shown corresponding to one another. The address book table 18 of FIG. 3, corresponding to the communication destination party information storage means, stores data on the name and telephone number of a communication destination candidate party together with a corresponding country flag. A country flag, which is a characteristic feature of this embodiment, contains country identifying information, i.e., information indicative of a country where the communication destination candidate party is present, in other words, a country in which a circuit connection can be established when each telephone number registered in the address book table 18 is dialed intact. In the example of FIG. 3, "0" stands for Japan, "1" for the U.S., and "2" for others. Note that, differing from the above example with three flag groups, each for Japan, the U.S., and others, it is of course possible to prepare an additional identification flag uniquely assigned to a country other than Japan and the U.S., or to impart a different value to each country. Further, communication destination party identification information may include any information, besides the names exemplified in this embodiment, i.e., TARO and TOM, which are names which the user may generally use for registration in the address book, such as an individual name, a company name, and a nickname, which can discriminate a communication destination party to make it identifiable for the user of the portable telephone device 1.

The emergency telephone number table 19 is a table listing emergency telephone numbers, such as those for police or fire services, used in respective countries in a manner that relevant telephone numbers over the respective countries are shown corresponding to one another.

This embodiment is characterized by the fact that each telephone number is registered in the address book table 18, together with a country flag, as country identifying information, for identifying a country where a circuit connection can be established when each telephone number registered in the address book table 18 is dialed intact, in other words, a country where the communication destination party is a subscriber of the service (hereinafter referred to as a subscribing country). Therefore, when the user makes a call on a portable telephone device 1 using a memory dial function, the country where the user is using the portable telephone device 1 is automatically identified. The using country information identifying a country where the portable telephone device 1 is used, is compared with the country identifying information of the communication destination party, and the telephone number registered in the address book table 18 is dialed either intact or after automatically dialing any additional number, such as a country code, depending on whether or not the two countries are the same. With this arrangement, the user can place a call using the memory dial function using the same procedure, regardless of the country in which he uses the portable telephone device 1.

Next, an operation of this embodiment will be described, beginning with an operation for registration in an address book, followed by that for making a call.

Figure 4:
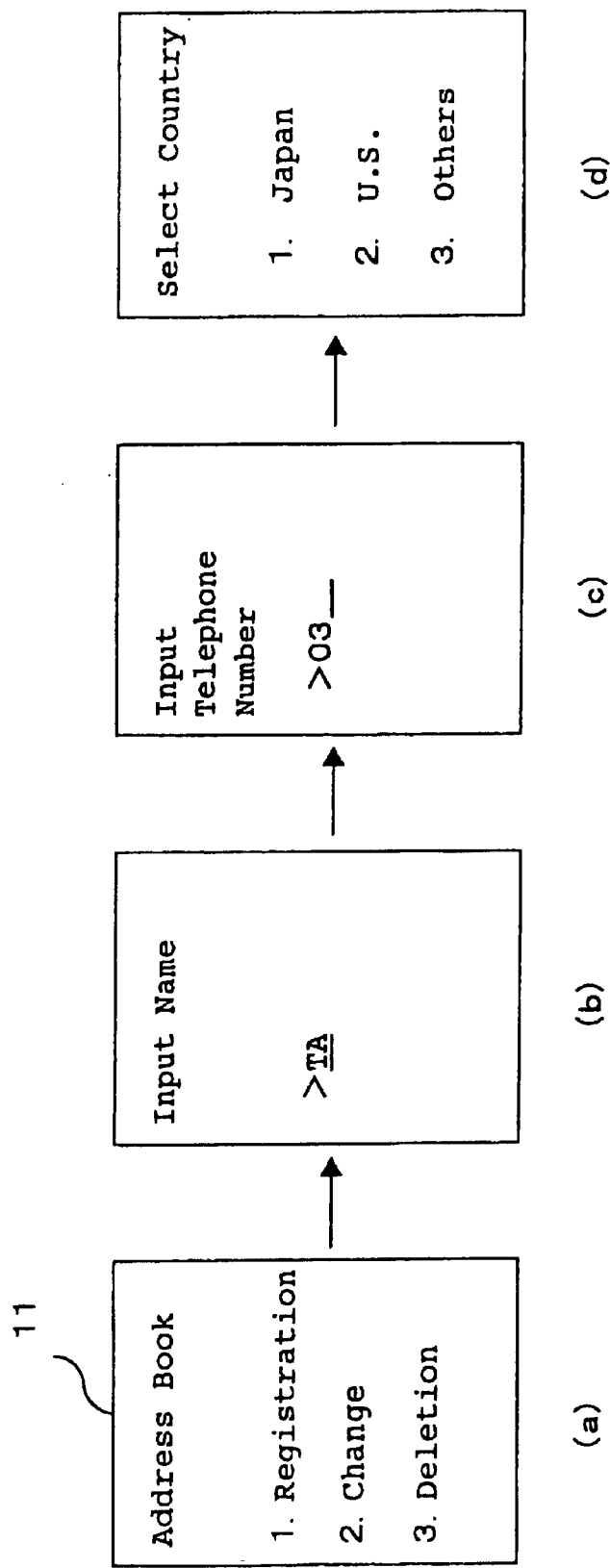
FIG. 4 is a diagram showing transition of screen images being displayed during an operation for registration in an address book according to the first preferred embodiment.

In response to the user's predetermined button operation, the communication destination party information updating processor 17 displays an address book registration screen image (a) on the LCD panel 11, as shown in FIG. 4. When "1. Registration" is selected by the user, the communication destination party information updating processor 17 then displays input screen images (b) and (c) in this order to encourage the user to input data on the name and telephone number of a communication destination candidate party. Subsequently, the communication destination party information updating processor 17 displays a selection screen image (d) to encourage the user to select an appropriate country. Having received input data on the name, telephone number, and country of each communication destination candidate party, the communication destination party information updating processor 17 correlates the data on the respective items to one another to prepare communication destination party information, and registers the resultant information in the address book table 18. Note that the object of registration in the address book is to obtain data on the name and telephone number of and a country flag for a communication destination candidate party. A registration procedure is thus not limited to the above.

Figure 5:
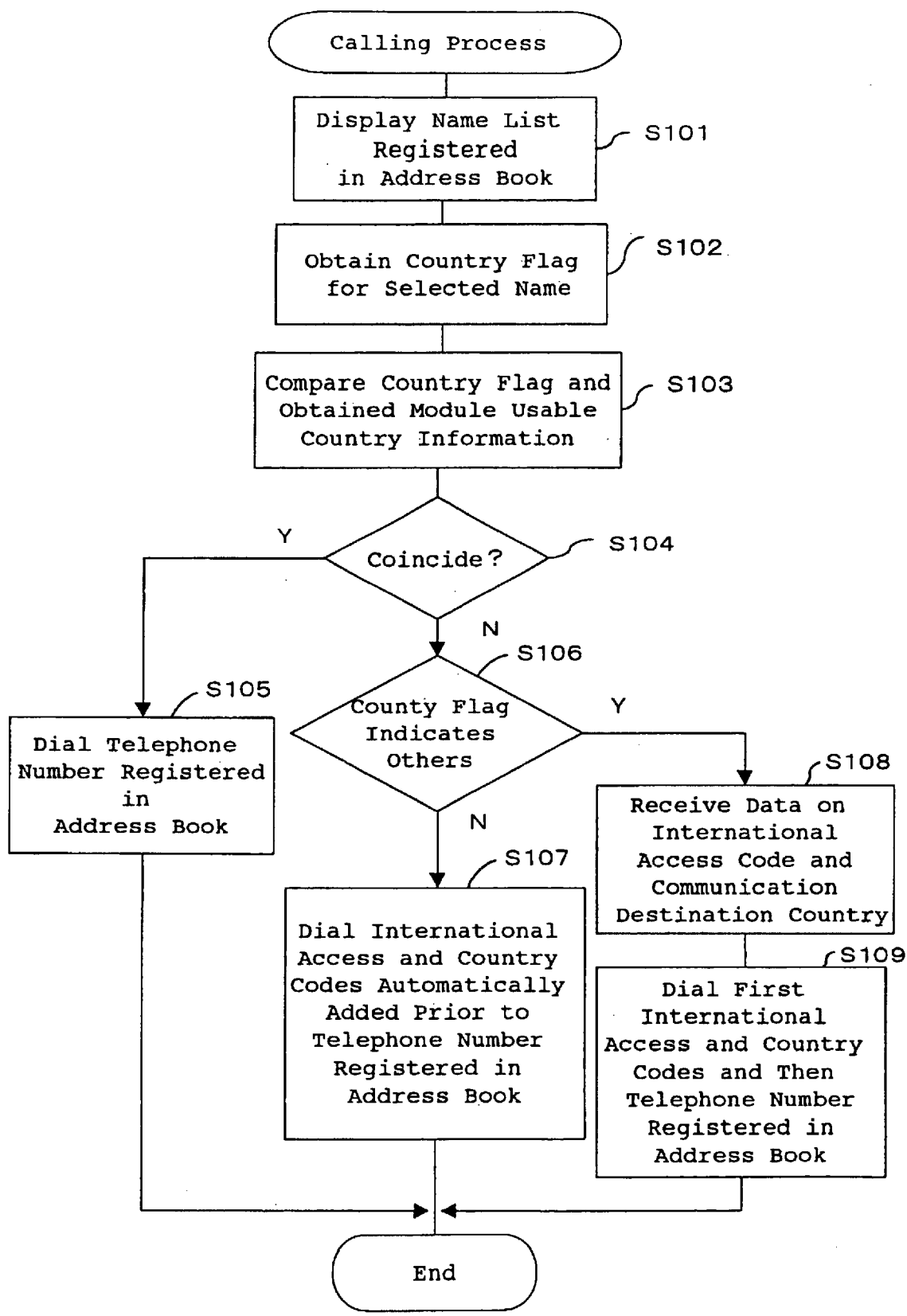
FIG. 5 is a flowchart indicative of calling processing according to the first preferred embodiment.

An operation for making a call in this embodiment will be described referring to the flowchart of FIG. 5, beginning with a call within the same country, i.e., a case where the user of a portable telephone device 1 in Japan calls TARO in Japan. A call within the same country is referred to as a domestic call.

Figure 6:
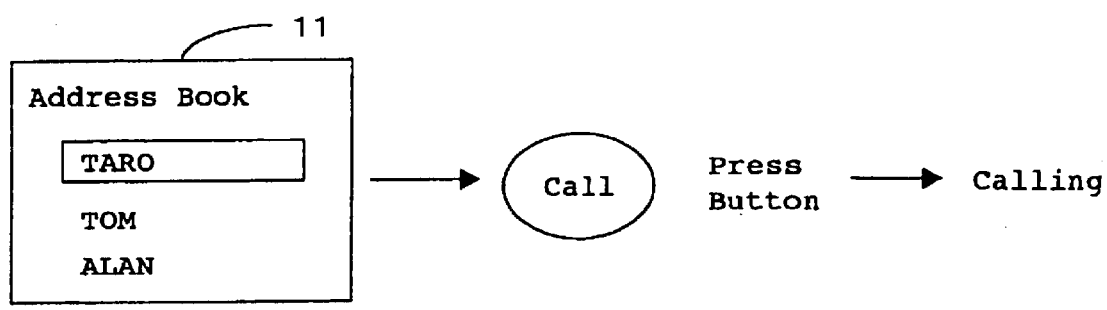
FIG. 6 is a diagram showing an operation procedure for making a call using a memory dial function according to the first preferred embodiment.

The user carries out a predetermined button operation using a memory dial function to display the names registered in the address book table 18 in the form of a list as shown in FIG. 6 (step 101). After the user's selection of TARO from among the displayed names and application of a call operation by pressing a call button, the calling processor 16 retrieves the country flag data for TARO, i.e., "0", from the address book table 18 (step 102). The calling processor 16 then compares the retrieved country flag data and using country information, obtained from the RF module 2 (Step 103).

Using country information is information indicative of a country where the portable telephone device 1 is used. Note that, when the device 1 is used in an area near the border between two nations, the device 1 may not always be connected to a base station in the same country where the device 1 is being used. In this sense, more strictly speaking, using country information is information indicative of a country which adopts a communication system allowing the RF module 2 attached to the telephone device body 3, to perform radio communication. In other words, using country information is information indicative of a country including a base station to which the device 1 is connected. In Embodiment 1, as the RF module 2 is detachable, using country information can be reworded as information indicative of a country where the RF module 2 is used, and therefore referred to as module usable country information.

In this embodiment, in response to an inquiry from the body controller 14 of the telephone device body 3, the radio communication controller 6 of the RF module 2 sends module usable country information by outputting, for example, data "0" indicating that the attached RF module 2 is configured for use in Japan, and data "1" for use in the U.S. The body controller 14 sends an inquiry when the RF module 2 is attached to the body controller 14, and internally stores the received reply. Note that this embodiment is achieved based on the assumption that a proper RF module 2 which is usable in a country where the user uses the associated portable telephone device 1, has correctly been attached to the telephone device body 3 by the user.

In Step 103, since comparison proves that the country flag "0" for TARO" coincides with the module usable country information "0" supplied from the RF module 2, the calling processor 16 directly dials the telephone number registered in the address book table 18 (Steps 104, 105).

Next, a case where the user in Japan calls TOM in the U.S. will be described. Note that a call addressing a party overseas is referred to as an international call.

The user carries out a predetermined button operation using a memory dial function to display the names registered in the address book table 18 in the form of a list as shown in FIG. 6 (step 101). After the user's selection of TOM from among the displayed names and application of a call operation by pressing a call button, the calling processor 16 retrieves country flag data for TOM, i.e., "1", from the address book table 18 (step 102). Then, the calling processor 16 compares the retrieved country flag data and module usable country information, obtained from the RF module 2 (Step 103). Processing thus far is identical to that for a domestic call.

In this example, however, as the RF module 2 attached to the telephone device body 3 is the one for use in Japan, the country flag for TOM "1" does not coincide with the module usable country information "0". Therefore, the calling processor 16 first dials an international access code for specifying an international telephone company, and a country code, and then the telephone number registered in the address book table 18 (steps 104, 105, 106). Note that, in this embodiment, as an international access code is initially set in the portable telephone device 1 and stored in the internal memory 13, designation of an international access code is unnecessary.

The above process is also applied to a case where the user in the U.S. makes an international call on the portable telephone device 1 to TARO in Japan. That is, an international access code and a country code are automatically added, in dialing, to the number registered in the address book table 18 with omission of the leading "0" of the area code.

As described above, in this embodiment, when the user makes a call to a specific communication destination party using a memory dial function, and that call is an international call, an international access code and a country code are automatically dialed prior to the dialing of the registered telephone number. Therefore, the user can make all calls using the same calling procedure shown in FIG. 6, regardless as to whether the dialed party is located in or out of the country where the user is calling from.

Figure 7:
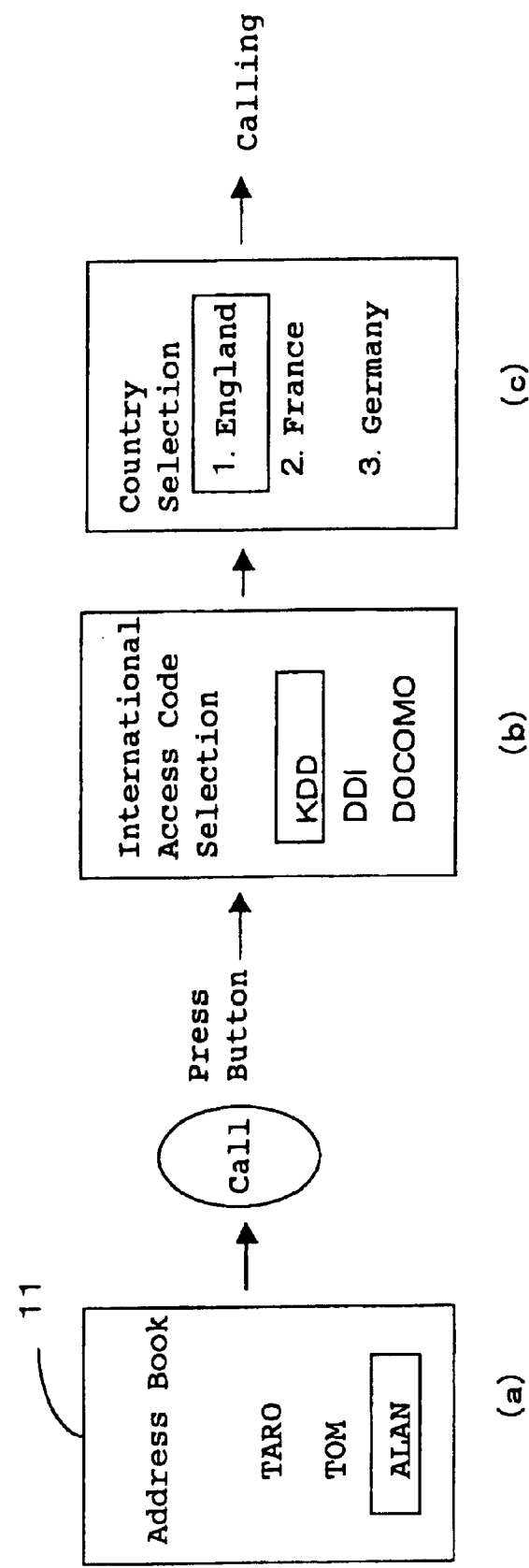
FIG. 7 is a diagram showing an operation procedure for making a call using a memory dial function according to the first preferred embodiment.

Here, when the user of the portable telephone device 1 in Japan makes an international call to ALAN in any country other than Japan or the U.S., the user selects ALAN from the list displayed on the LCD panel 11, as shown in FIG. 7, and presses down the calling button. Country flag data for ALAN, which indicates "2", is thereupon retrieved from the address book table 18 (Steps 101, 102). Through comparison between the retrieved country flag data for ALAN and the module usable country information obtained from the RF module 2, it is known that they do not coincide to each other and that the country flag for ALAN, or "2", represents other countries (Steps 103, 104, 106). In this case, as a country code, necessary for making an international call, is unknown, the calling processor 16 displays a screen image on the LCD panel 11 to encourage the user to select the country of the communication destination party and an international telephone company. The calling processor 16 receives input data on the user's selection of the company and country (step 108), and then internally converts them into an international access code and a country code for preparation of an international telephone number for ALAN in a form used in the call destination country (Step 109). The preparation is achieved through addition of the converted international and country codes prior to ALAN's registered telephone number and other modification, if necessary, such as omission of the leading "0" of the area code.

Note that an international access code and a country code may be directly input, or an international telephone company may also be fixed set for every communication destination party or country, rather than being selected from a list displayed on the LCD panel 11, as shown in FIG. 7, which is described in the above only as an example of a method for specifying international access and country codes. Also, an international access code, which is initially set in the above example with a call from a caller in Japan to Tom in the U.S., may instead be set for selection for every call via the selection screen image shown in FIG. 7. Ordinarily, a portable telephone device may be provided with a mode setting function for selecting the above modes for specifying an international access code, rather than fixedly employing one of the above described international access code selection methods.

Here, an emergency telephone number table 19 is provided in the internal memory 13 in this embodiment, which is used as follows.

For example, a Japanese person wishing to call the police in the U.S. may know only the Japanese emergency number for police, i.e., "110", and may not know the corresponding U.S. number, i.e., "911". In an emergency, he may even dial "110" in the U.S. if he is under stress or distraught.

In order to cope with such a case, an operation of this embodiment will be performed as follows.

The calling processor 16 initially detects whether or not the dialed emergency number is registered in an emergency telephone number table 19 with a country flag indicative of the country indicated by the module usable country information obtained from the RF module 2. If it is registered, the calling processor 16 puts through a call in the dialed telephone number intact. This process corresponds to a case where a U.S. emergency number, e.g., 911, is dialed in the U.S.

On the other hand, if the dialed number is not registered, the calling processor 16 then checks emergency telephone numbers registered in emergency telephone number tables 19 with country flags indicative of countries other than that which is indicated by the module usable country information. When the dialed number is found in any of the tables 19, the calling processor 16 then converts the dialed telephone number into a corresponding telephone number included in the table 19 for the country of the module usable country information.

Specifically, when "110", or a Japanese emergency telephone number, is dialed in the U.S., the calling processor 16 finds that "110" is not registered in the emergency telephone number table 19 with the country flag "1", identical to the module usable country information, obtained from the RF module 2. The calling processor 16 then checks an emergency telephone number table 16 for a country flag "0", different from the module usable country information "1", and finds "110" in that table 16. Therefore, the calling processor 16 converts "110" into a corresponding emergency telephone number, or "911", included in the table 16 for the country indicated by the module usable country information "1".

As described above, in this embodiment, a user located in a country other than his home country without the knowledge of emergency telephone numbers of that country, can still make an emergency call on the portable telephone device 1 by dialing a corresponding emergency number of his country. It should be noted that, in the case where a person from a country, e.g., the U.S., which adopts the same telephone number for a police and a fire station, dials "911" in Japan, the calling processor 16 must convert the dialed "911" into either "110" or "119". For conversion, the calling processor 16 may either automatically select "110" or "119", or display an inquiry message on the LCD panel to encourage the user's selection.

In this embodiment, the telephone device body 3 can know in which country the RF module 2 attached thereto is usable, referring to a reply containing module usable country information, supplied from the radio communication controller 6 of the RF module 2 in response to an inquiry from the body controller 14. That is, the body controller 14 of this embodiment is informed of module usable country information through receipt of a reply from the RF module 2, i.e., by means of software. Differing from the above, the body controller 14 may be informed of the information by means of hardware. Specifically, an RF module 2 may be formed having a part for connection with the telephone device body 3, which is differently shaped for every country where the RF module 2 is used, and the telephone device body 3 may be formed having a hardware structure as a module usable country information recognition means for recognizing the peculiar shape of the connection part of the RF module 2 attached to the body 3. For example, as shown in FIG. 1, a recess 2a in the form of a slot, a notch, or the like, may be formed in the connection part of the RF module 2 so as to have a different arrangement, depth, or length, or a different number of slots are formed, depending on countries, and the module usable country information recognition means, provided to the telephone device body 3, can detect characteristics of the shape of each recess 2a for understanding of module usable country information.

Also, an RF module for a plurality of radio communication systems is available. A radio communication controller 6 of such an RF module 2 may initially communicate with the base station via radio to specify a communication system for use, and then supplies module usable country information corresponding to the specified communication system to the body controller 14. Further, an RF module capable of radio communication in world-common communication system has recently been standardized. A radio communication controller 6 of such an RF module initially communicates via radio with a base station to specify country and positional information, and then supplies module usable country information corresponding to the specified country and positional information to the body controller 14. Still further, when a portable telephone device 1 is used in some limited countries only, e.g., in Japan and the U.S. only, a telephone number for use in Japan and that in the U.S. can be discriminated depending on the presence or absence of "0" at the top of each telephone number. Therefore, it is unnecessary to register a country flag in the address book table 18 as the first number of each telephone number serves equivalent to a country flag.

Embodiment 2

FIG. 8 is a schematic diagram showing a structure of internal data stored in the internal memory 13 in this embodiment. Different from the first example, in which a country flag is correspondingly attached to each telephone number for registration in the internal memory 13, in this embodiment, an entry region may be provided in the internal memory 13, as shown in FIG. 8, so that telephone numbers with the same destination countries can be collectively registered in a corresponding entry region. Further, data on a communication destination candidate party may be added for registration in the entry region for the country where the party is present. Here, a grouping function, for example, which is available on a portable telephone device supplied by NTT Mobil Communication Network, Inc. can be effectively utilized when a group number is used as a country flag.

Embodiment 3

In Embodiment 1, telephone numbers are registered in the address book table 18 in the form for domestic calls.

Differently from the above, in this embodiment, telephone numbers are registered in a form appropriate for international calls. The registered numbers are automatically converted when placing a domestic call by deleting therefrom international access and country codes, and the like.

Figures 9, 10:
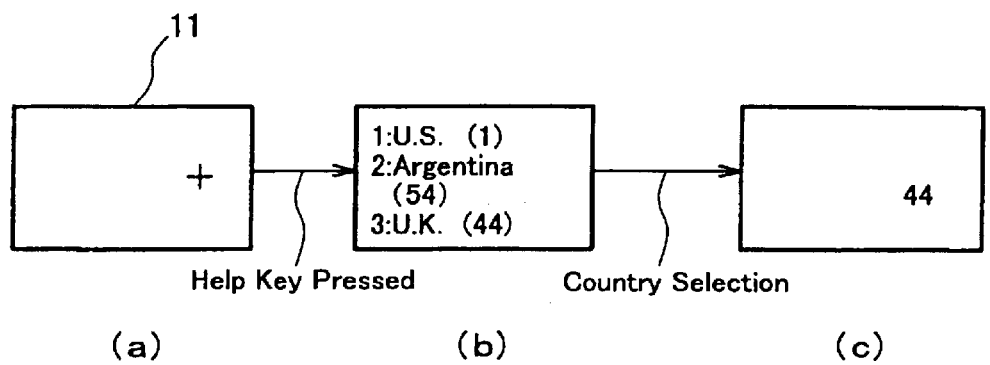
FIG. 9 is a diagram showing an example of a data structure of an address book table according to a third preferred embodiment.
FIG. 10 is a diagram showing an example of a display screen for telephone number input process according to the third preferred embodiment.

FIG. 9 is a diagram showing an example of data structure for the address book table 18 in this embodiment. International numbers are shown in three different formats in FIG. 9, each including a country code. Whereas a country flag is attached as country identifying information in Embodiment 1, a country flag is unnecessary in this embodiment because an international telephone number including a country number is registered available for use as country identifying information. In this case, however, it is necessary to contrive an arrangement for identifying a part designating a country code, in a registered telephone number. In FIG. 9(a), separations ("−" in this embodiment) are inserted between each an international access code and a country code, and a country code and a telephone number effective in a subscribing country so that a country code can be located. In FIG. 9(b), a country code is described following the mark "+", according to a standard description for international telephone numbers. In FIG. 9(c), international access and country codes and a telephone number are expressed successively. In this case, the number is compared with an international access code registered in advance, to find a part of an international access code in the entire number, and a part following the international access code located is determined as a country code.

Calling processing is basically the same as that described for Embodiment 1 except that a judgement as to whether or not to apply a telephone number conversion is made invertedly as telephone numbers are registered in the form appropriate for international calls to the address book table 18 in this embodiment. Specifically, when a country flag for calling destination party (a country code in telephone number information in this embodiment) obtained from the address book table 18 in the internal memory is compared with using country information obtained from the RF module 2, and when they do not coincide with each other, an intended telephone call is determined as an international call in embodiment 1, and automatic conversion is applied. Whereas in this embodiment, when a country flag for calling destination party obtained from the address book table 18 does not coincide with using country information obtained from the RF module and the relevant call is determined as an international call, a registered telephone number is used intact, without automatic conversion. Specifically, the registered telephone number is dialed only after deletion of "−" in the example of FIG. 9(a). And the registered telephone number is dialed after deletion of "+" and is added an international code in the example of FIG. 9(b). For an example of FIG. 9(c), the registered telephone number is dialed intact.

On the other hand, when the county code for a communication destination party and the using country information coincide with each other and it is therefore determined that the relevant telephone call is a domestic call, automatic conversion is applied before dialing by deleting a country code, a specified international access code, and additional marks, such as "−", from the registered telephone number. Note that, in this case, when a subscribing country is Japan, as shown in FIG. 9, additional modification is made, if necessary, such as addition of "0" for area code. As described above, for domestic callings, telephone numbers registered in the address book table 18 must be automatically converted into a suitable form before dialing as they are registered in the form appropriate for international calls.

Figure 11:
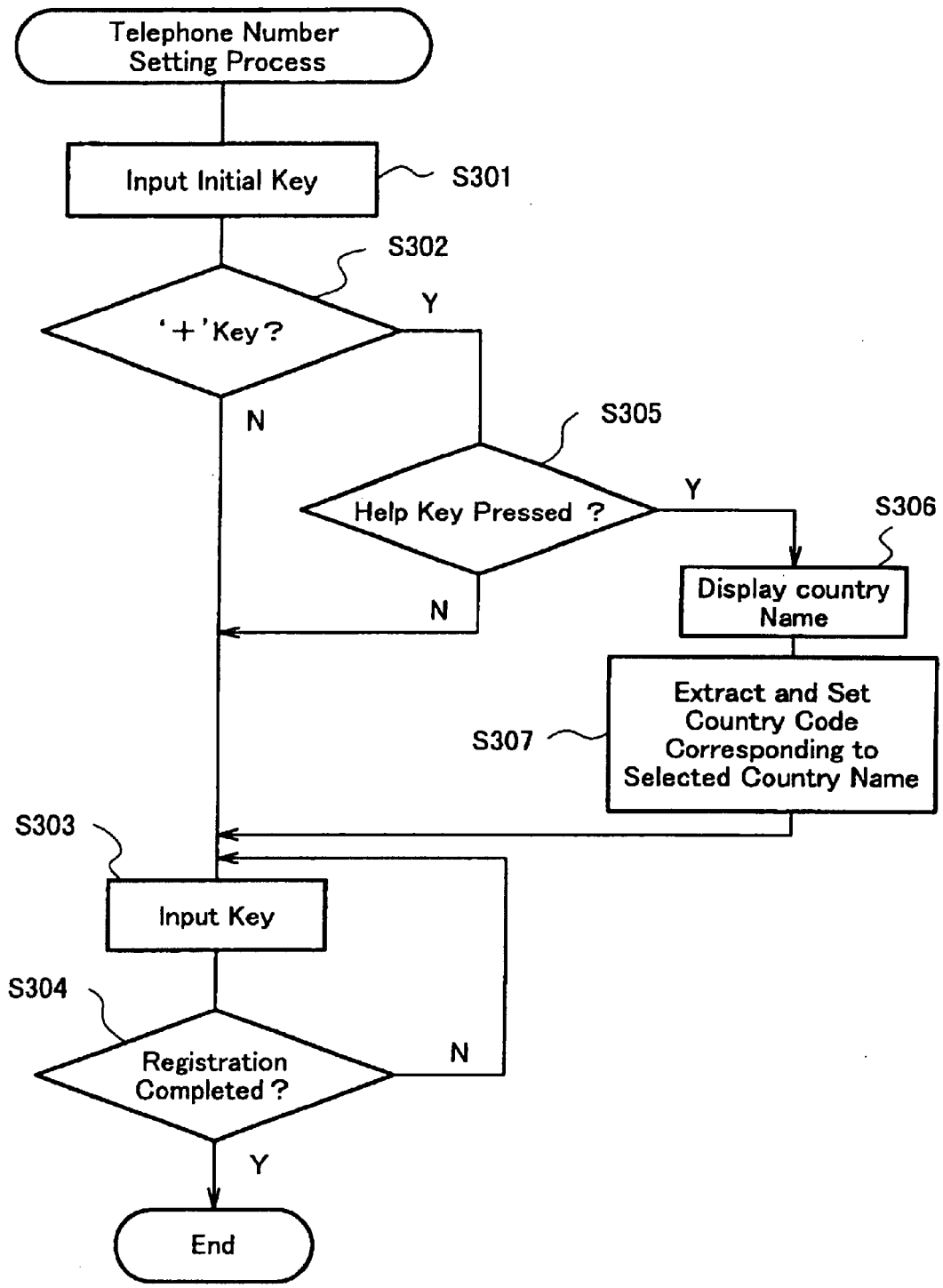
FIG. 11 is a flowchart indicative of telephone number input process according to the third preferred embodiment.

Here, in this embodiment, telephone numbers including country codes are required to be registered in advance to the address book table 18. However, a user may not always know country codes of the respective countries at the time of registration. In order to cope with such a situation, a function for displaying country names is provided so that a user can select a desired one from the displayed screen to thereby input a correct country code. A function for telephone number input and setting will be described referring to the screen images in FIG. 10 and the flowchart in FIG. 11.

In a registration process with a call destination information to the address book table 18, when any key other than "+" is initially pressed, it is determined that a country code is being input (steps 301, 302), and the following key inputs are received until input completion key is pressed (steps 303, 304). This process, corresponding to a case where the number is input in the form shown in FIG. 9(c), is to be applied by a user knowing a country code.

When "+" is initially pressed, followed by any number keys but a help key, or a country list reading key, it is determined that a telephone number will be input in the format shown in FIG. 9(b), and the numbers being inputs are understood as a country code (Steps 305, 303, 304).

Meanwhile, when "+" is initially pressed, followed by a help key, a country list is displayed as shown in FIG. 10(b) (step 306). After a user selects a desired country from the list through a predetermined key operation, the country code of the selected country is extracted from a country code table internally held (step 307). FIG. 10(c) shows a display example where "3 U.K." is selected.

Figure 12:
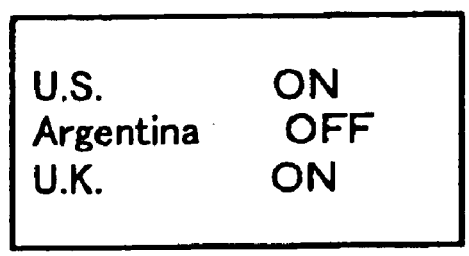
FIG. 12 is a diagram showing a display screen for country code setting according to the third preferred embodiment.

Note that, although countries are displayed in Japanese alphabetical order in FIG. 10(b), they may be displayed in country code sequence. Alternatively, an additional function may be provided for displaying a screen as shown in FIG. 12 to set ON or OFF for the respective countries so that the country list to be displayed includes only those with high possibility of selection, for enhanced selection efficiency.

The above process can be applied not only to input of a country code, as described above, but also to input of an international access code. In Embodiment 1, the international access code is fixedly set by using this process.

Embodiment 4

As described above, a registered telephone number is automatically converted before dialing when using country information and the country identifying information do not coincide in Embodiment 1, and when they do coincide in Embodiment 3. Differing from the above, in this embodiment, when the comparison between using country information and country identifying information indicates that a telephone number registered in the address book table 18 cannot be used intact for dialing, the concerned telephone number is read to display from the address book table 18 and suitably modified. In this arrangement, dialing is not applied until off-hook.

Here, it is true that a registered number cannot be used intact for dialing a call when the telephone number is registered including data other than numbers, such as shown in FIGS. 9(a) and 9(b). However, as is obvious from the above embodiments, a case where a registered number "cannot be dialed intact" here refers to a case where an international call is to be made using a registered telephone number registered in a domestic call format, or a domestic call using a registered telephone number registered in an international call format.

With a calling destination party selected using a memory dial function and an off-hook button pressed, the calling processor 16 determines whether or not the registered telephone number is usable intact. When determined usable, the calling processor 16 dials the number intact, when the LCD panel 11 presents the display as shown in FIG. 13(*a*). On the other hand, when the calling processor 16 determines that it is not, a telephone number registered to the address book table 18 is displayed as shown in FIG. 13(*b*), and an edit mode is set. In an edit mode, a cursor is displayed at the initial number of the displayed telephone number, so that a user can edit the displayed number into a telephone number suitable for, in this embodiment, an international call, as shown in FIG. 13(*c*), by, for example, inserting "01181" and deleting "0". In response to a subsequent off-hook instruction, the calling processor 16 dials the resultant number. As described above, a telephone number may be edited by a user instead of through automatic conversion.

Embodiment 5

Figure 14:
FIG. 14 is a diagram showing an example of an internal data structure for an internal memory storing a temporary number according to a fifth preferred embodiment.

In Embodiment 4, a registered telephone number is edited into a suitable form to dial the intended call. In this embodiment, an edited telephone number, once used in dialing a call, is temporarily stored. The internal memory 13 includes an area for temporal storage of an edit telephone number (hereinafter referred to as a "temporary number"). FIG. 14 shows an example of information stored in this area. The stored information includes the name of a communication destination party, a corresponding telephone number registered in the address book table 18, a corresponding temporary number, and a corresponding country flag indicative of a country where a call was made using the corresponding temporary number. Note that a temporary number memory means in FIG. 14 may be incorporated into the address book table 18.

The dialing process in this embodiment will next be described. With a communication destination party selected using a memory dial function and an off-hook button pressed, the calling processor 16 compares using country information, obtained at the time of dialing a call, and a country flag temporarily stored in the address book table 18. When they coincide with each other, the calling processor 16 automatically dials the temporary number stored in the temporary number memory area 18*a*. With this function, a user is freed from the need to repeat the same edit operation as he conducted before when he calls to the same party from the same country. On the other hand, when they do not coincide with each other, the temporarily stored country flag and the temporary number are deleted, and the process described in the preceding embodiments is applied using a registered telephone number for dialing a call.

Note that, providing that a user moves from a certain country to another country, both being a country other than where a calling destination party is a subscriber of telephone service, the temporary number dialed when the user in the certain country called to the calling destination party may be used intact when the user calls the same party again from another country to which the user has been moved. To determine such cases, a function may be provided for comparing a country flag of a subscribing country and country identifying information indicative of a country where the user is present. That is, depending on a situation, it may not always be necessary to delete a temporary number.

Moreover, a temporary number may be kept with a validity/invalidity flag of the temporary number instead of being deleted.

Embodiment 6

Figure 17:
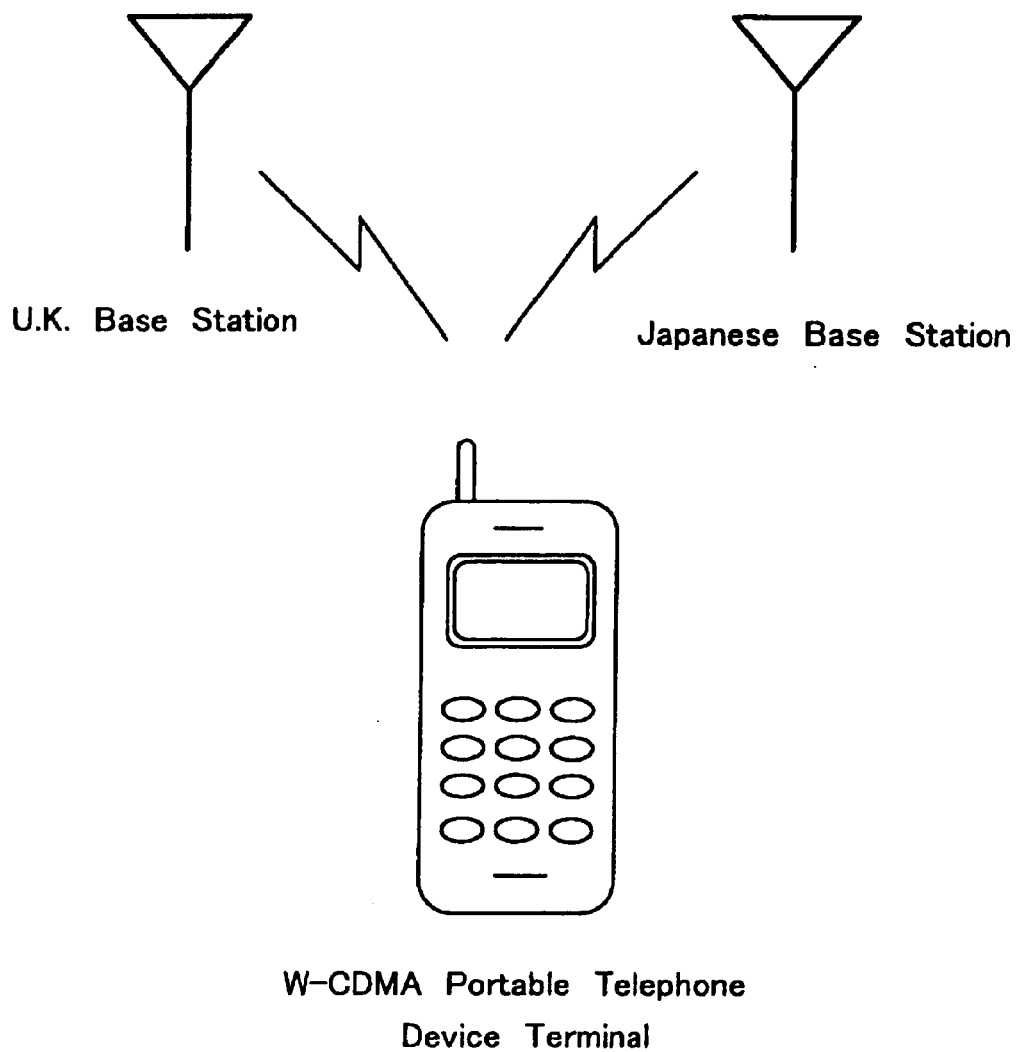
FIG. 17 is a conceptual diagram illustrating communication among a plurality of countries using a same portable telephone device according to the sixth preferred embodiment.

FIG. 15 is a diagram showing announcement information format defined in "Digital Car Telephone System Standard Format RCR STD-27H ver. (hereinafter referred to as STD-27) by Electric Wave Industry Society. Announcement information is for notification from a network to users (i.e., terminals of portable telephone devices 1) of information concerning control channel structures, an awaiting channel determination, regulations, and so on. Announcement information includes a network number, of which details are shown in FIG. 16. A network number must include a county code, a company group number, and number information within a group. A country code of a country where a connected base station (network) is located can be known from this information. Note that regulations are now being defined concerning country code and company group number as indispensable information items for the above mentioned world-uniformed standard format, or W-CDMA. As the W-CDMA format is going to be adapted in Japan and Europe, a user can call to both Japan and Europe using a single telephone device, the concept of which is illustrated in FIG. 17.

As described above, whereas a country where a portable telephone device 1 is used must be recognized on a portable telephone device side in Embodiment 1, according to a standard format in this embodiment, using country information can be obtained by referring to announcement information, including a country code, supplied from a base station.

Recognition of using country information will be described in more detail below. A detachable RF module 2 in Embodiment 1 is usable only in a specific country, and generates using country information or has a peculiar shape so that a portable telephone device 3 can obtain using country information by being connected to the RF module 2 as an information source. In other words, an RF module 2 is formed detachable, and prepared for every using country in Embodiment 1 as the RF module 2 is used for recognition of a using country.

On the contrary, in this embodiment, in which a country code, corresponding to using country information, is supplied from a base station, country identifying information can be known with reference to the supplied country code. Therefore, an RF module 2 as a source of using country information is unnecessary.

Further, when the information sent from a base station relaying communication with a calling destination party is in the above mentioned standard format, a detachable RF module 2 is unnecessary because an RF module 2 is not used as a source of using country information. Therefore, an RF module 2 can be formed integrated with a telephone device main body 3. Because of this, popular integrated portable telephone devices can be used without changes or modifications, and users need not carry RF modules 2 for other countries with him.

In addition, the feature that one integrated portable telephone device is usable in two or more countries is particularly advantageous in continental Europe, where nations share borders and people may thus have many occasions to cross borders, unlike in an island nation such as Japan, because the feature enables people to use a memory dial function without concerning in which country they are then present.

Nevertheless, it should be noted that applicability of this embodiment is not limited according to the shape of portable telephone devices, and that this embodiment may be applied to detachable portable telephone devices or portable telephone devices capable of radio communication according to two or more communication formats. It should also be noted that, although a portable telephone device with a detachable RF module 2 is mainly referred to in Embodiment 2 and thereafter, following an example mentioned in Embodiment 1, these embodiments can be applied to portable telephone devices of other types without difficulty. This is also true of the embodiments described below.

In addition, the above advantage can be achieved in compliance with currently adapted formats (PDC, GSM, IS-95, and so on), global formats (CDMA 2000, UWC-136, and so on), and any format to be introduced in the future, as long as a using country can be identified from country code information provided from a base station.

Here, in this embodiment, using country information in country information received from a base station when making a call is stored in the internal memory 13. When the portable telephone device once leaves a coverage area of the base station and returns to an area allowing connection with the base station or when the received using country information is different from that stored in the internal memory, the using country information stored in the internal memory is updated. The update, however, need not be applied on every such occasion, but may, for example, be performed only when the next call is being placed.

Received using country information may be displayed on the LCD panel 11 for the reason below. That is, for example, when a user near the boundary between countries A and B calls from country A to a party in country A, the circuit may be connected to a base station in country B because of wave intensity or any other reason. In other words, the user intending to make a domestic call may possibly be forced to make an international call. By notifying the user of such a situation, unnecessary charges to the user can be avoided.

In addition, automatic roaming may continued even for an established connection. Therefore, in this embodiment, a function is additionally provided for fixedly setting a using country which was selected at the time of making a call whereby a once-established connection can be maintained. When a user along a country border between countries A and B can be connected to base stations in both countries A and B, circuit connection should be fixed to either country to prevent unnecessary roaming. With this arrangement, utility of a base station (or a country) along a country border can be improved. This function may be made effective or released through a predetermined key operation and so on which is applied at the time of line connection.

Figure 18:
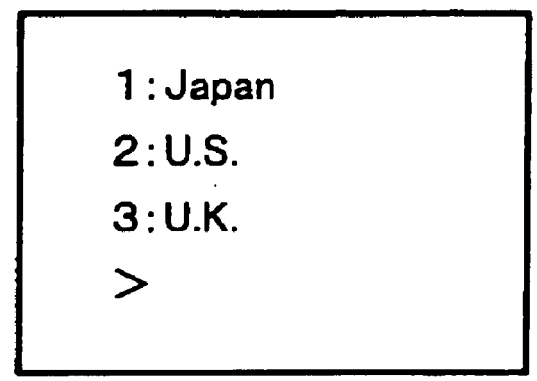
FIG. 18 is a diagram showing an example of a display screen for using country setting according to the sixth preferred embodiment.

Alternatively, instead of automatic connection to a country at the time of dialing a call, circuit connection may be manually fixed. FIG. 18 shows an example of a screen for a user to designate to country which the portable telephone device is to be connected. A user selects a country on this screen to thereby fix the circuit connection to that country. This fixing function can be used for a limitation purpose of countries where the portable telephone device 1 is allowed to be used.

While the circuit connection is fixed, the established circuit might be disconnected as the user goes away from the connected base station. To address this problem, connection priority is set to the respective countries so that a circuit can be automatically connected at the time of dialing a call to a country, when two or more countries are available, with higher priority.

As criterion for priority orders, domestic and international fee tables for respective countries may be stored in the internal memory 13, so that a circuit can be connected or roamed to a more inexpensive base station when allowed. The criterion is not limited to prices, but other factors. Even manual switching of circuit connection may be allowed. Preferably, a message may be displayed to notify a user of switching connection destinations. A fee table may be stored in an USIM (Universal subscriber Identity Module), a detachable external memory, and so on, instead of in the internal memory 13.

Embodiment 7

In Embodiment 6, it is described that a memory dial function is usable without causing a user to concern in which country he is then present. This is achieved thanks to an address book table 18 including country identifying information attached to each telephone number, and being stored in the internal memory 13, or a calling destination party information memory means, to be installed to :a portable telephone device.

Differing from the previous embodiments, in this embodiment, the communication destination party information memory means including an address book table 18 registered therein is provided detachably from an associated portable telephone device. With this arrangement, a user traveling to another country need not carry a portable telephone device with him, but may carry only a calling destination party information memory means. When the means is installed to a portable telephone device the user obtains in his destination country, the user can use the memory dial function using the address book table 18 in that country. A calling destination party information memory means may be a non-volatile memory means, such as a memory, an IC card, an USIM card, and so on. This detachable memory, and so on, does not depend on a communication system, and is usable with any portable telephone device which can read an address book from the attached memory and so on.

Embodiment 8

In Embodiment 6, using country information obtained from the information sent from a base station is compared with the country identifying information of a communication destination party in a portable telephone device 1 to thereby determine whether or not an intended telephone call is a domestic or international call, and the corresponding registered telephone number is automatically converted, if necessary, before dialing a call.

In this embodiment, telephone number conversion is carried out on a base station side. Specifically, in dialing a call, the calling processor 16 sends to a base station, when making a dial call, the telephone number of the communication destination party, registered in the address book table 18 together with country identifying information for the party. In the base station, the received country identifying information is compared with using country information, or information for identifying a country where the base station is located, so that the received telephone number is converted, if necessary, appropriately into for a domestic or international call, based on the comparison result. Conversion can be applied in the procedure described in the Embodiment 1 or 3, details of which are not repeated here.

As described above, when country identifying information is sent to a base station when making a dial call, telephone number conversion can be made on a base station side.

Embodiment 9

In the above respective embodiments, even when a telephone number of a communication destination party is registered to an address book table 18 in only a single format, a user is able to place a call from any country to the party using a dial memory function utilizing automatic conversion to a registered telephone number upon necessity. In this embodiment, subscriber number information for each communication destination party is set in a plurality of formats each corresponding to each country. FIG. 19 shows an example of a data structure for an address book table 18 in this embodiment. As shown, a plurality sets of call destination information, each comprising a telephone number and using country information, is prepared for each communication destination party.

Dialing a call in this embodiment will next be described.

A user applies a predetermined button operation using a memory dial function whereby a name list of call destination parties registered in the address book table 18 is displayed. The user then selects a desired communication destination party (e.g., "TARO") from among them. Meanwhile, the calling processor 16 obtains, for example, using country information from the information provided from a base station, similar to Embodiment 6. Specifically, a user in Japan may receive using country information "0", while a user in the U.S. may receive using country information "1". The calling processor 16 then selects, from the address book table 18, call destination information including using country information identical to the obtained using country information, and dials the corresponding telephone number. For example, to call TARO in Japan, the calling processor 16 dials "0312345678" for a user in Japan, and "00181312345678" for a user in the U.S.

According to this embodiment, a user can use a memory dial function without concerning as to where a communication destination party is in the country where the user is then present.

It should be noted that, although this embodiment is characterized in that two or more sets of call destination information are prepared for each communication destination party, only a single set of call destination information prepared for a communication destination party will not hinder use of a dial function.

It should also be noted that, although a portable telephone device for radio communication is taken as an example of a portable communication device in the preceding embodiments, a mobile computer with a telephone function is also included in the scope of the present invention. The present invention can be applied not only to a portable communication device for radio communication but also to that connected via a line to a telephone network. A communication module for a wired device can be achieved using a PC card attachable to a mobile computer. Further, the calling processing shown in FIG. 5 can be applied to a communication device which is not portable.

Although a detachable portable telephone device 1, rather than a conventional portable telephone device of an integrated type, is mainly referred to in Embodiments 1 to 5, the functions and means other than a using country information recognizing means for recognizing a using country based on the shape and so on of an RF module 2 as described above, can be applied to portable telephone devices of an integrated type. The respective features described in the above embodiments can also be used in combination, where possible.

One of the objects of the above embodiments is to enable a user in any country to automatically make a call using a memory dial function. A calling method using a portable telephone device 1 includes not only one requiring input of a telephone number and one utilizing a memory dial, but also one utilizing a redial function. A redial function is a function for facilitating recalling by utilizing a history for past few calls, which is stored in the device. When a user moving out from or into a country with a communication destination party to or from a country without the communication destination party, wishes to call again to the same party, the telephone number dialed before the movement cannot be used intact. In such a case, the dialed telephone number is stored in the call history, together with using country information or such that included international access and country code and so on can be identified. This arrangement can help the user to make a call again to the same party, using a redialing function without concerning as to in which country the user is then present.

In the above, it has been described for brevity of explanation that an international call can be made by dialing an international telephone number, or specifically by first dialing international access and country codes and then a domestic telephone number. However, at the present stage, an international call cannot be directly made on a portable telephone device 1. Therefore, in actuality, dialing an international telephone number, prepared by adding international and country codes prior to a domestic telephone number, as described above, cannot establish line connection for an international call.

Even so, the present invention is characterized by a structure capable of automatic discrimination between domestic and international calls, and of dialing either a registered telephone number intact for a domestic call or an international telephone number prepared based on the registered telephone number through automatic modification given thereto such as addition of any required number, e.g., a country code, or omission of any unnecessary number. For example, when using WORLD CALL service, offered by NTT IDO TSUSHINMOU K.K., "0091-30" may be automatically dialed in the place of international and country codes to establish a connection, then followed by dialing a tone signal (DTMF tone, push tone), a country code, a registered telephone number, and "#" key sound. Of course, when it becomes possible to make an international call directly on a portable telephone device 1 in the future, the above described process can be applied without such or similar modification.

What is claimed is:

1. A portable communication device for communication via a connected telephone circuit, comprising:

communication destination party information memory means for storing communication destination party information including communication destination party identifying information of a communication destination party, subscriber number information of the communication destination party, and country identifying information for identifying a country where the communication destination party is a subscriber of telephone service, wherein the communication destination party information memory means is divided into memory regions corresponding to different destination countries so that each different region includes communication destination party identifying information of the communication destination party and subscriber number information of communication destination party of a respective different destination country;

input/output means for displaying, in response to a user's operation, a list of the communication destination party identifying information stored in the communication destination party information memory means;

calling processing means for dialing a call to a communication destination party selected from the list of the communication destination party identifying information displayed by the input/output means; and using country information recognizing means for recognizing means for automatically recognizing, without a user input command, a country where the portable communication device is connected to the telephone circuit;

wherein the calling processing means automatically converts, as necessary, the subscriber number information stored in the communication destination party information memory means into a subscriber number suitable for a domestic or international call based on a result of comparison between the using country information recognized by the using country information recognizing means and the country identifying information of the communication destination party selected as a call destination, and dials a resultant subscriber number.

2. A portable communication device according to claim 1, wherein the subscriber number information includes a subscriber number for a domestic call from a country where the communication destination party is a subscriber of the telephone service to the communication destination party in the country, and the calling processing means automatically converts the subscriber number of the communication destination party, registered in the communication destination party information memory means, into a subscriber number suitable for an international call when the comparison between the using country information and the country identifying information results that they do not coincide with each other, and dials the resultant subscriber number, the subscriber number suitable for an international call including a country code of a country specified by the country identifying information of the communication destination party.

3. A portable communication device according to claim 1, wherein the subscriber number information includes information, at least a country code, which enables an international call from outside a country where the communication destination party is a subscriber of the telephone service to the communication destination party in the country and the calling processing means automatically converts the subscriber number of the communication destination party, registered in the communication destination party information memory means, into a subscriber number suitable for a domestic call to the communication destination party by deleting at least the country code therefrom when the comparison between the using country information and the country identifying information results that they coincide with each other, and dials the resultant subscriber number.

4. A portable communication device according to claim 1, wherein the communication destination party information memory means is provided detachably.

5. A portable communication device for radio communication according to claim 1, comprising:

a communication module for connecting to a telephone circuit; and a communication device main body for communication via the communication module;

wherein the communication module comprises an antenna, transmitter/receiver means for transmitting and receiving a message via the antenna, and radio communication control means for controlling radio communication according to a predetermined communication format.

6. A portable communication device according to claim 5, in the form of a portable telephone device.

7. A portable communication device according to claim 6, wherein the communication module is formed detachable with respect to the communication device main body.

8. A portable communication device according to claim 7, wherein the communication module has a part abutting on the communication device main body, the part having a different shape for every country; and the using country information recognizing means specifies using country information of the communication module connected thereto by detecting a shape of the part abutting on the communication device main body, of the communication module.

9. A portable communication device according to claim 1, comprising:

a communication module for connecting to a telephone circuit; and a communication device main body for communication via the communication module;

wherein the communication module has using country information replying means for replying using country information in response to an inquiry from the calling processing means.

10. A portable communication device according to claim 1, further comprising communication destination party information registration means for generating communication destination party information based on information concerning a communication destination party input via the input/output means, a subscriber number of the communication destination party, and a country where the communication destination party is a subscriber of the telephone service, and for registering the communication destination party information to the communication destination party memory means.

11. A portable communication device according to claim 1, wherein the communication destination party information memory means has a country registration area provided thereto in advance for every country identifying information so that communication destination party identifying information and a subscriber number are stored in the country registration area of a corresponding country.

12. A portable communication device for communication via a connected telephone circuit, comprising:

communication destination party information memory means for storing communication destination party information including communication destination party identifying information of a communication destination party, subscriber number information of the communication destination party, and country identifying information for identifying a country where the communication destination party is a subscriber of a telephone service, wherein the communication destination party information memory means is divided into memory regions corresponding to different destination countries so that each different region includes communication destination party identifying information of the communication destination party and subscriber number information of communication destination party of a respective different destination country;

input/output means for displaying, in response to a user's operation, a list of the communication destination party identifying information stored in the communication destination party information memory means;

calling processing means for dialing a call to a communication destination party selected from the list of the communication destination party identifying information displayed by the input/output means; and using country information recognizing means for automatically recognizing, without a user input command, a country where the portable communication device is connected to the telephone circuit;

wherein when making a call, the calling processing means is able to change a selected subscriber number information, based on judgement that the subscriber number information of the communication destination party, stored in the communication destination party information memory means, is not usable for dialing a call, the judgement being based on comparison between the using country information recognized by the using country information recognizing means and the country identifying information of the communication destination party selected as a called party.

13. A portable communication device according to claim 12, wherein the calling processing means automatically places the selected subscriber number information in an edit mode when the using country information does not coincide with the country identifying information.

14. A portable communication device according to claim 12, further comprising a temporary number memory means for temporarily storing a temporary number and using country information when the calling processing means calls the communication destination party selected, by dialing the temporary number, the temporary number being formed by editing the subscriber number information, wherein the calling processing means calls the communication destination party by dialing the temporary number temporarily stored, when the using country information recognized by the using country information recognizing means coincides with the using country information of the communication destination party stored in the temporary number memory means.

15. A portable communication device according to claim 14, wherein information of the communication destination party, stored in the temporary number memory means, is erased when the using country information recognized by the using country information recognizing means does not coincide with the using country information of the communication destination party, stored in the temporary number memory means.

16. A portable communication device according to claim 12, wherein the communication destination party information memory means is provided detachably.

17. A portable communication device for communication with a communication destination party via a base station through a connected telephone circuit, comprising:

communication destination party information memory means for storing communication destination party information including communication destination party identifying information of a communication destination party, subscriber number information of the communication destination party, and country identifying information for identifying a country where the communication destination party is a subscriber of a telephone service, wherein the communication destination party information memory means is divided into memory regions corresponding to different destination countries so that each different region includes communication destination party identifying information of the communication destination party and subscriber number information of communication destination party of a respective different destination country;

input/output means for displaying, in response to a user's operation, a list of the communication destination party identifying information stored in the communication destination party information memory means;

using country information recognizing means for obtaining, from information sent from the base station, using country information of a country where the portable communication device is connected to the telephone circuit;

calling processing means for specifying a subscriber number when a call is made to a communication destination party selected as a called party from a list of communication destination party identifying information displayed by the input/output means, based on a comparison between the using country information recognized by the using country information recognizing means and the country identifying information of the communication destination party selected as a called party.

18. A portable communication device according to claim 17, wherein the communication destination party information memory means stores, in place of the communication destination party information, at least one information, including a pair, for every communication destination party, constituting of using country information and subscriber number information to be referred to when making a call from the using country to the communication destination party, and the calling processing means places a call based on subscriber number information designated in communication destination party information including using country information coincident with using country information recognized by the using country information recognizing means.

19. A portable communication device according to claim 17, carrying out radio communication using a circuit fixedly connected to circuits of the country to which the circuit was initially connected at a time of making a call.

20. A portable communication device according to claim 17, wherein the communication destination party information memory means is provided detachably.

21. An automatic calling method employed in a portable communication device for communication via a connected telephone circuit, comprising:

a communication destination party candidate displaying step of extracting communication destination party identifying information from communication destination party information memory means and displaying a list thereof, said memory means stores the communication destination party information including communication destination party identifying information of a communication destination party, subscriber number information of the communication destination party, and country identifying information for identifying a country where the communication destination party is a subscriber of telephone service, wherein the communication destination party information memory means is divided into memory regions corresponding to different destination countries so that each different region includes communication destination party identifying information of the communication destination party and subscriber number information of communication destination party of a respective different destination country;

a comparison step of comparing country identifying information corresponding to a communication destination party selected from the list of communication destination party identifying information displayed at the communication destination party candidate displaying step, and using country information specifying a country where the portable communication device is connected to the telephone circuit, the country information being automatically recognized, without a user input command; and a calling step of automatically converting, as necessary, the subscriber number information of the communication destination party selected, into a subscriber number suitable for a domestic or international call based on a result of comparison made at the comparison step, and making a call.

22. An automatic calling method employed in a portable communication device for communication via a connected telephone circuit, comprising:

a communication destination party candidate displaying step of extracting communication destination party identifying information from communication destination party information memory means to display a list thereof, said memory means stores the communication destination party information including communication destination party identifying information of a communication destination party, subscriber number information of the communication destination party, and country identifying information for identifying a country where the communication destination party is a subscriber of telephone service, wherein the communication destination party information memory means is divided into memory regions corresponding to different destination countries so that each different region includes communication destination party identifying information of the communication destination party and subscriber number information of communication destination party of a respective different destination country;

a comparison step of comparing country identifying information corresponding to a communication destination party selected from the list of communication destination party identifying information displayed at the communication destination party candidate displaying step, and using country information specifying a country where the portable communication device is connected to the telephone circuit, the country information being automatically recognized, without a user input command; and a calling step of displaying, for editing, the subscriber number information when a judgement is made based on a result of comparison made at the comparison step, that the subscriber number information of the communication destination party, stored in the communication destination party information memory means, is not usable intact for dialing a call, and making a call using a resultant subscriber number edited.

23. A portable communication device for communication via a connected telephone circuit, comprising:

communication destination party information memory means for storing communication destination party information including communication destination party identifying information of a communication destination party, subscriber number information of the communication destination party, and country identifying information for identifying a country where the communication destination party is a subscriber of telephone service;

input/output means for displaying, in response to a user's operation, a list of the communication destination party identifying information stored in the communication destination party information memory means;

calling processing means for dialing a call to a communication destination party selected from the list of the communication destination party identifying information displayed by the input/output means; and using country information recognizing means for recognizing a country where the portable communication device is connected to the telephone circuit;

a communication module for connecting to a telephone circuit; and a communication device main body for communication via the communication module;

wherein the communication module comprises an antenna, transmitter/receiver means for transmitting and receiving a message via the antenna, and radio communication control means for controlling radio communication according to a predetermined communication format, and the communication module has a part abutting on the communication device main body, the part having a different shape for every country; and the using country information recognizing means specifies using country information of the communication module connected thereto by detecting a shape of the part abutting on the communication device main body, of the communication module, and wherein the calling processing means automatically converts, as necessary, the subscriber number information stored in the communication destination party information memory means into a subscriber number suitable for a domestic or international call based on a result of comparison between the using country information recognized by the using country information recognizing means and the country identifying information of the communication destination party selected as a call destination, and dials a resultant subscriber number.

24. A portable communication device according to claim 23, wherein the subscriber number information includes a subscriber number for a domestic call from a country where the communication destination party is a subscriber of the telephone service to the communication destination party in the country, and the calling processing means automatically converts the subscriber number of the communication destination party, registered in the communication destination party information memory means, into a subscriber number suitable for an international call when the comparison between the using country information and the country identifying information results that they do not coincide with each other, and dials the resultant subscriber number, the subscriber number suitable for an international call including a country code of a country specified by the country identifying information of the communication destination party.

25. A portable communication device according to claim 23, wherein the subscriber number information includes information, at least a country code, which enables an international call from outside a country where the communication destination party is a subscriber of the telephone service to the communication destination party in the country and the calling processing means automatically converts the subscriber number of the communication destination party, registered in the communication destination party information memory means, into a subscriber number suitable for a domestic call to the communication destination party by deleting at least the country code therefrom when the comparison between the using country information and the country identifying information results that they coincide with each other, and dials the resultant subscriber number.

26. A portable communication device according to claim 23, wherein the communication destination party information memory means is provided detachably.

27. A portable communication device according to claim 23, in the form of a portable telephone device.

28. A portable communication device according to claim 23, further comprising communication destination party information registration means for generating communication destination party information based on information concerning a communication destination party input via the input/output means, a subscriber number of the communication destination party, and a country where the communication destination party is a subscriber of the telephone service, and for registering the communication destination party information to the communication destination party memory means.

29. A portable communication device according to claim 23, wherein the communication destination party information memory means has a country registration area provided thereto in advance for every country identifying information so that communication destination party identifying information and a subscriber number are stored in the country registration area of a corresponding country.

* * * * *